(12) United States Patent
Holden et al.

(10) Patent No.: US 7,987,124 B1
(45) Date of Patent: Jul. 26, 2011

(54) METHOD OF AND SYSTEM FOR EVALUATING AN APPRAISAL VALUE ASSOCIATED WITH A LOAN

(75) Inventors: Steven J. Holden, Bethesda, MD (US);
Randall K. Price, Fairfax, VA (US);
Mark T. Simpson, Olney, MD (US);
Kagan E. Coughlin, Chevy Chase, MD (US)

(73) Assignee: Fannie Mae, Washington, DC (US)

( * ) Notice: Subject to any disclaimer, the term of this patent is extended or adjusted under 35 U.S.C. 154(b) by 880 days.

(21) Appl. No.: 11/207,162

(22) Filed: Aug. 18, 2005

Related U.S. Application Data (60) Provisional application No. 60/603,393, filed on Aug. 20, 2004.

(51) Int. Cl.
*G06Q 40/00* (2006.01)

(52) U.S. Cl. ............... 705/35; 705/7; 705/36 R; 705/38; 705/40; 705/306; 705/400; 273/271; 707/104.1

(58) Field of Classification Search .............. 705/7, 35, 705/36 R, 38, 40, 306, 400; 273/271; 707/104.1
See application file for complete search history.

(56) References Cited

U.S. PATENT DOCUMENTS

| | | | |
|---|---|---|---|
| 4,637,614 A * | 1/1987 | Gibbon et al. .............. 273/271 |
| 5,611,052 A | 3/1997 | Dykstra et al. | |
| 5,644,726 A * | 7/1997 | Oppenheimer ............ 705/36 R |
| 5,870,720 A * | 2/1999 | Chusid et al. ................... 705/38 |
| 5,870,721 A | 2/1999 | Norris | |
| 5,878,403 A | 3/1999 | DeFrancesco et al. | |
| 5,930,776 A | 7/1999 | Dykstra et al. | |
| 5,940,812 A | 8/1999 | Tengel et al. | |
| 5,966,700 A | 10/1999 | Gould et al. | |
| 5,983,206 A * | 11/1999 | Oppenheimer ............... 705/38 |
| 5,995,947 A | 11/1999 | Fraser et al. | |
| 6,088,686 A | 7/2000 | Walker et al. | |

(Continued)

FOREIGN PATENT DOCUMENTS

EP    1288822    *    1/2002

(Continued)

OTHER PUBLICATIONS

Definition of "Threshold" from Webster's Dictionary, 1828 Edition, One (1) page.*

(Continued)

*Primary Examiner* — James P Trammell
*Assistant Examiner* — Sanjeev Malhotra
(74) *Attorney, Agent, or Firm* — Foley & Lardner LLP (57) ABSTRACT

A method of and system for evaluating an appraisal value associated with a loan are disclosed. The method includes receiving an appraisal value and at least one of foreclosure sale data and purchase money transaction data associated with a loan in a computerized system. The method also includes estimating the accuracy of the appraisal value based the at least one of foreclosure sale data and purchase money transaction data. The system includes memory configured to store an appraisal value and at least one of foreclosure sale data and purchase money transaction data associated with the loan. The system also includes a processor coupled to the memory and operable to execute programmed instructions, wherein the programmed instructions are configured to estimate the accuracy of the appraisal value based on the at least one of foreclosure sale data and purchase money transaction data.

15 Claims, 3 Drawing Sheets

U.S. PATENT DOCUMENTS

| | | | |
|---|---|---|---|
| 6,105,007 | A | 8/2000 | Norris |
| 6,233,566 | B1 | 5/2001 | Levine et al. |
| 6,345,262 | B1 * | 2/2002 | Madden .......................... 705/38 |
| 6,385,594 | B1 | 5/2002 | Lebda et al. |
| 6,405,181 | B2 | 6/2002 | Lent et al. |
| 6,438,526 | B1 | 8/2002 | Dykes et al. |
| 6,484,153 | B1 | 11/2002 | Walker et al. |
| 6,505,176 | B2 | 1/2003 | DeFrancesco, Jr. et al. |
| 6,611,816 | B2 | 8/2003 | Lebda et al. |
| 6,823,319 | B1 | 11/2004 | Lynch et al. |
| 6,904,414 | B2 * | 6/2005 | Madden .......................... 705/38 |
| 6,988,082 | B1 | 1/2006 | Williams et al. |
| 7,146,337 | B1 | 12/2006 | Ward et al. |
| 7,289,965 | B1 * | 10/2007 | Bradley et al. .................. 705/1 |
| 7,315,841 | B1 | 1/2008 | McDonald et al. |
| 2001/0029482 | A1 | 10/2001 | Tealdi et al. |
| 2001/0032178 | A1 | 10/2001 | Adams et al. |
| 2001/0037287 | A1 | 11/2001 | Broadbent et al. |
| 2001/0047326 | A1 | 11/2001 | Broadbent et al. |
| 2001/0047327 | A1 * | 11/2001 | Courtney ........................ 705/38 |
| 2002/0023051 | A1 | 2/2002 | Kunzle et al. |
| 2002/0029194 | A1 | 3/2002 | Lewis et al. |
| 2002/0052835 | A1 | 5/2002 | Toscano |
| 2002/0059137 | A1 | 5/2002 | Freeman et al. |
| 2002/0069159 | A1 | 6/2002 | Talbot et al. |
| 2002/0091630 | A1 | 7/2002 | Inoue |
| 2002/0099650 | A1 | 7/2002 | Cole |
| 2002/0138414 | A1 | 9/2002 | Baker, IV |
| 2002/0152155 | A1 | 10/2002 | Greenwood et al. |
| 2003/0018558 | A1 | 1/2003 | Heffner et al. |
| 2003/0033241 | A1 | 2/2003 | Harari |
| 2003/0033242 | A1 | 2/2003 | Lynch et al. |
| 2003/0036994 | A1 | 2/2003 | Witzig et al. |
| 2003/0046199 | A1 * | 3/2003 | Murase et al. .................. 705/35 |
| 2003/0065614 | A1 | 4/2003 | Sweeney |
| 2003/0093365 | A1 | 5/2003 | Halper et al. |
| 2003/0093366 | A1 | 5/2003 | Halper et al. |
| 2003/0149656 | A1 * | 8/2003 | Magruder et al. .............. 705/38 |
| 2003/0229581 | A1 | 12/2003 | Green et al. |
| 2003/0233324 | A1 * | 12/2003 | Hammour et al. .............. 705/40 |
| 2004/0002915 | A1 | 1/2004 | McDonald et al. |
| 2004/0138996 | A1 | 7/2004 | Bettenburg et al. |
| 2005/0033618 | A1 * | 2/2005 | Rexius .............................. 705/7 |
| 2005/0038818 | A1 * | 2/2005 | Hooks ........................ 707/104.1 |
| 2005/0044050 | A1 * | 2/2005 | Hendrickson et al. ........ 705/400 |
| 2005/0197953 | A1 | 9/2005 | Broadbent et al. |
| 2006/0106695 | A1 * | 5/2006 | Carlson et al. ................. 705/35 |
| 2006/0282356 | A1 * | 12/2006 | Andres et al. .................. 705/35 |
| 2007/0299753 | A1 * | 12/2007 | Averbuch et al. .............. 705/35 |
| 2008/0027845 | A1 * | 1/2008 | Dreyer et al. .................. 705/35 |

FOREIGN PATENT DOCUMENTS

| | | |
|---|---|---|
| WO | WO 99/13425 | 3/1999 |
| WO | WO 99/59084 | 11/1999 |
| WO | WO 00/21011 | 4/2000 |
| WO | WO 00/62209 | 10/2000 |
| WO | WO 00/75833 | 12/2000 |
| WO | WO 01/27832 | 4/2001 |
| WO | WO 01/41019 | 6/2001 |
| WO | WO 01/50318 | 7/2001 |

OTHER PUBLICATIONS

Definition of "Threshold" from Webster's Dictionary, 1913 Edition, One (1) page.*

Fannie Mae, "Guide to Underwriting with Desktop Underwriter," Washington, D.C., U.S.A., version 4.0, Oct. 1997 (152 pgs.).

Fannie Mae, "Guide to Underwriting with Desktop Underwriter," Washington, D.C., U.S.A., Sep. 2002, (63 pgs.).

* cited by examiner

METHOD OF AND SYSTEM FOR EVALUATING AN APPRAISAL VALUE ASSOCIATED WITH A LOAN

CROSS-REFERENCE TO RELATED APPLICATIONS

This application claims the benefit of U.S. Provisional Application No. 60/603,393, filed Aug. 20, 2004 and entitled "Method and System for Evaluating an Appraisal Value Associated With a Loan," the entire content of which is hereby incorporated by reference.

BACKGROUND

The present invention relates generally to methods of and systems for processing data pertaining to financial assets, such as loans, securities, and so forth, and more particularly to methods of and systems for evaluating an appraisal value associated with a loan.

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential homebuyers consult lenders such as banks, credit unions, mortgage companies, savings and loan institutions, state and local housing finance agencies, and so on, to obtain the funds necessary to purchase or refinance their homes. These lenders offer mortgage products to potential home buyers. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan to investors in the "secondary mortgage market" (e.g., pension funds, insurance companies, securities dealers, financial institutions, and various other investors) to replenish its supply of funds. The loan may be sold alone, or in packages of other similar loans, for cash or in exchange for mortgage backed securities (MBS) which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

The ability to assess the credit risk associated with a mortgage loan is important to the lender. A defaulted loan or a delinquent loan is costly to the owner of the asset (initially the lender in the primary mortgage market). Thus, the lender tries to avoid making loans in situations where there is a significant likelihood that the loan will later default or be delinquent. As a lender improves its ability to determine credit risk associated with a loan, the costs associated with lending go down. Fewer loans are given that default or become delinquent. In the secondary mortgage market, where mortgage loans are commonly sold to investors, fewer defaulted/delinquent loans results in a better return on investment, resulting in increased capital flow to the housing market. Better risk predictions, therefore, decrease the defaults/delinquencies, improve capital flow to the housing market, and ultimately decrease mortgage costs for consumers.

Mortgage loans originated by a lender (or alternatively a broker) are typically underwritten before being closed or prior to delivery (i.e., sale) to a purchaser in the secondary mortgage market. Although the final underwriting decision is made by the lender, the lender may submit a loan to an automated underwriting engine of the purchaser to obtain an indication whether the loan meets the credit risk and eligibility requirements of the purchaser based on a set of loan information provided by the lender. Such loan information typically includes borrower-specific risk factors, loan-specific risk factors, and property-specific risk factors. Borrower-specific risk factors may include factors such as the borrower's credit score, as well as other factors such as the borrower's income and financial reserves. Property-specific risk factors may include factors such as an appraisal value (e.g., submitted by the borrower). Loan-specific risk factors may include factors such as the loan-to-value ratio, the loan amount, the loan purpose, and so on.

Oftentimes during the underwriting process, and particularly with regard to assessing credit risk associated with a mortgage loan undergoing the underwriting process, a lender will need to assess the accuracy of loan information provided to the lender by a borrower. For example, the lender may need to assess the accuracy of an appraisal value submitted to the lender by a borrower in a refinancing transaction in order to determine whether the appraisal value submitted by the borrower is an accurate valuation or an excessive valuation of the particular property to be financed. While the lender may typically obtain a second independent appraisal value for comparison with the appraisal value submitted by the borrower, such as with an automated property valuation model, other loan information or characteristics may need to be considered when comparing the appraisal values in order to effectively identify lending transactions with potential excessive valuation issues.

Thus, there is need for a method of and system for evaluating an appraisal value associated with a loan that is configured to use loan information, such as foreclosure sale information or purchase money transaction information, to automatically identify lending transactions with potential excessive valuation issues. There is further need for a method of and system for evaluating an appraisal value associated with a loan that is configured to provide a message indicating that a potential excessive valuation issue exists for the lending transaction.

SUMMARY

According to an exemplary embodiment, a method of evaluating an appraisal value associated with a loan includes receiving the appraisal value and at least one of foreclosure sale data and purchase money transaction data associated with the loan in a computerized system. The method also includes estimating the accuracy of the appraisal value based on the at least one of foreclosure sale data and purchase money transaction data.

According to another exemplary embodiment, a system for evaluating an appraisal value associated with a loan includes memory configured to store the appraisal value and at least one of foreclosure sale data and purchase money transaction data associated with the loan. The system also includes a processor coupled to the memory and operable to execute programmed instructions, wherein the programmed instructions are configured to estimate the accuracy of the appraisal value based on the at least one of foreclosure sale data and purchase money transaction data.

According to another exemplary embodiment, a system for evaluating an appraisal value for a property associated with a mortgage loan includes means for receiving loan data for the mortgage loan, wherein loan data includes the appraisal value for the property and at least one of foreclosure sale data and purchase money transaction data. The system also includes means for estimating the accuracy of the appraisal value based on the at least one of foreclosure sale data and purchase money transaction data, and means for generating a message related to the estimated accuracy of the appraisal value.

According to another exemplary embodiment, a method of evaluating a first appraisal value associated with a loan includes receiving loan data for the loan in a computerized system, wherein loan data includes the first appraisal value and at least one of foreclosure sale data and purchase money transaction data. The method also includes determining a second appraisal value independent of the first appraisal value, and estimating the accuracy of the first appraisal value based on the second appraisal value and the at least one of foreclosure sale data and purchase money transaction data.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Turning now to the FIGURES which illustrate the exemplary embodiments in detail, a method of and system for evaluating an appraisal value associated with a loan are disclosed. According to an exemplary embodiment, the method of and system for evaluating an appraisal value is configured to use loan information, such as foreclosure sale information or purchase money transaction information, to automatically identify lending transactions with potential excessive valuation issues for a property associated with the loan. The term "purchase money transaction," as used herein, refers to the acquisition of property through the payment of money or its equivalent. The term "refinancing transaction" refers to the process of paying off one loan with the proceeds from a new loan using the same property as security. The method of and system for evaluating an appraisal value associated with a loan may also be configured to provide a message indicating that a potential excessive valuation issue exists for the loan.

Figure 1:
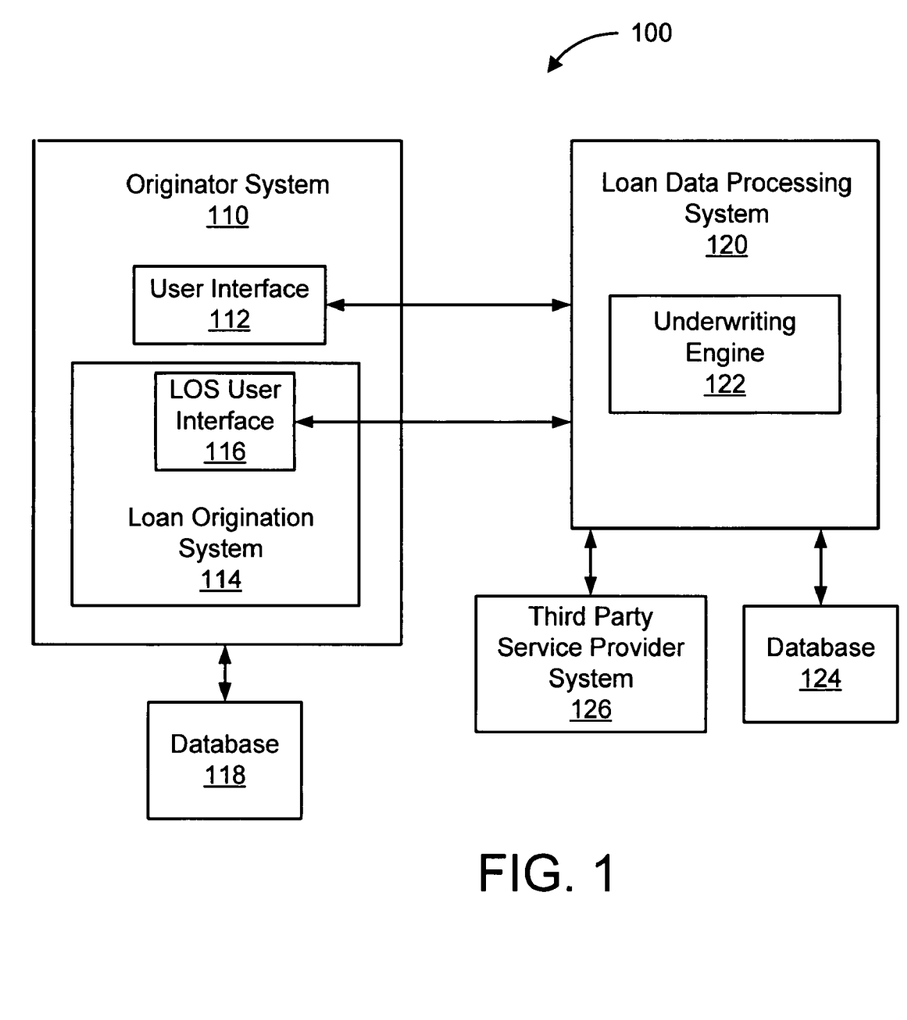
FIG. 1 is a block diagram illustrating a system for underwriting loans according to an exemplary embodiment.

The method of and system for evaluating an appraisal value associated with a loan in some embodiments may generally be implemented as part of a loan underwriting system. FIG. 1 illustrates a system 100 for underwriting loans, such as mortgage loans, according to an exemplary embodiment. As shown in FIG. 1, system 100 includes an originator system 110 and a loan data processing system 120. System 100 is generally configured to allow loan originators (e.g., lenders or third party originators such as brokers) to obtain underwriting recommendations for loan applications as well as other services associated with underwriting and originating loans (e.g., obtaining a credit report, title, MI, registering a loan, rate locking a loan, obtaining a price for a loan, etc.). More particularly, system 100 is configured to facilitate the evaluation of an appraisal value associated with a loan, such as an appraisal value submitted to a lender by a borrower for a property associated with a mortgage loan.

In the illustrated embodiment, originator system 110 is associated with and configured to be used by a third party originator such as a lender or broker. Loan data processing system 120 is associated with and configured to be used by a participant in a secondary market, such as the secondary mortgage market. Herein, for convenience, the secondary market participant is referred to as a "purchaser," although it should be understood that the purchaser may participate in the secondary market in other, different, or additional ways (e.g., as a loan guarantor, as a loan securitizer, and so on).

Engines and systems of system 100 may utilize existing computer capabilities, both hardware and software, and electronic communication links, for example, to receive and process (e.g., in real time) loan data provided by a broker, a lender, etc. Originator system 110 and loan data processing system 120 and engines and subsystems thereof may be implemented on computer systems or devices and may include computer servers. An exemplary computer system or device may include a general purpose computing device including a processing unit, a system memory, and a system bus that couples various system components including the system memory to the processing unit. The system memory may include read only memory (ROM) and random access memory (RAM). The computer may also include a magnetic hard disk drive for reading from and writing to a removable magnetic disk, and an optical disk drive for reading from or writing to a removable optical disk such as a CD-ROM or other optical media. The drives and their associated computer-readable media provide nonvolatile storage of computer-executable instructions, data structures, program modules, and other data for the computer. Systems 110 and 120 may be implemented on a separate logical server or using separate physical devices.

Exemplary computer systems or servers in system 100 may operate under the control of computer software to carry out the process steps described herein. Computer software for each system or engine may include a set of software objects and/or program elements including computer-executable instructions collectively having the ability to execute independently in a separate thread or logical chain of process evaluation, while permitting the flow of data inputs therebetween. Computer-executable instructions comprise, for example, instructions and data which cause a general or special purpose computer system or processing device to perform a certain function or group of functions.

Data may be communicated between the various systems and engines of system 100 in real time over the Internet or other computer network environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. It will be appreciated that such network computing environments will typically encompass many types of computer system configurations, including personal computers, hand-held devices, multi-processor systems, microprocessor-based or programmable consumer electronics, network PCs, minicomputers, mainframe computers, and the like. System 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It will be further be appreciated that system 100 may perform fewer or additional functions as compared to those described herein. For example, an entity (e.g., a lending institution) that performs only some of the above-mentioned processes may use a computer system that contains only a subset of the functions described herein. Additionally, one or more of the systems or functions of system 100 may be variously combined in alternative configurations.

Originator system 110 includes a user interface 112, a loan origination system (LOS) 114 including an LOS user interface 116, and is coupled to a database 118. User interface 112 may be used to access loan data processing system 120 in order to request and receive an underwriting recommendation for a loan. Preferably, a user accesses loan data processing system 120 through the Internet or an Intranet by using a personal/laptop computer or other suitable Internet-enabled device. For example, loan data processing system may be accessible to users by utilizing user interface 112 to access a web site or portal (e.g., a web site of the entity that owns/operates loan data processing system 120 such as a purchaser, lender, etc.) and clicking on appropriate links located at the web site or portal. LOS 114 may also be used to access loan data processing system 120 via the Internet. LOS 114 and LOS user interface 116 are preferably configured to establish a communication link with loan data processing system 120, such as an Internet connection. Accordingly, user interface 112 and LOS user interface 116 are configured to display different web pages of a web site relating to loan data processing system 120.

Loan data processing system 120 is includes an underwriting engine 122 and is coupled to a database 124 configured to store data received by loan data processing system 120. Loan data processing system 120 may also be coupled to third party service provider system 126 to obtain, for example, a requested credit report, title, MI, etc. Loan data processing system 120 is preferably configured to support various transactions which may be executed by a purchaser in connection with one or more loans. For example, in the illustrated embodiment, underwriting engine 122 is in data communication with originator system 110 via a data connection, such as an Internet connection. Underwriting engine 122 receives loan data from originator system 110 and returns an underwriting recommendation and any other requested information to originator system 110 via user interface 112 or LOS user interface 116. According to an exemplary embodiment, underwriting engine 122 is configured to receive loan data including an appraisal value associated with a loan forwarded by loan services engine 130, to evaluate the accuracy of the appraisal value, and to provide a message indicating whether the appraisal value is potentially excessive.

Figure 2:
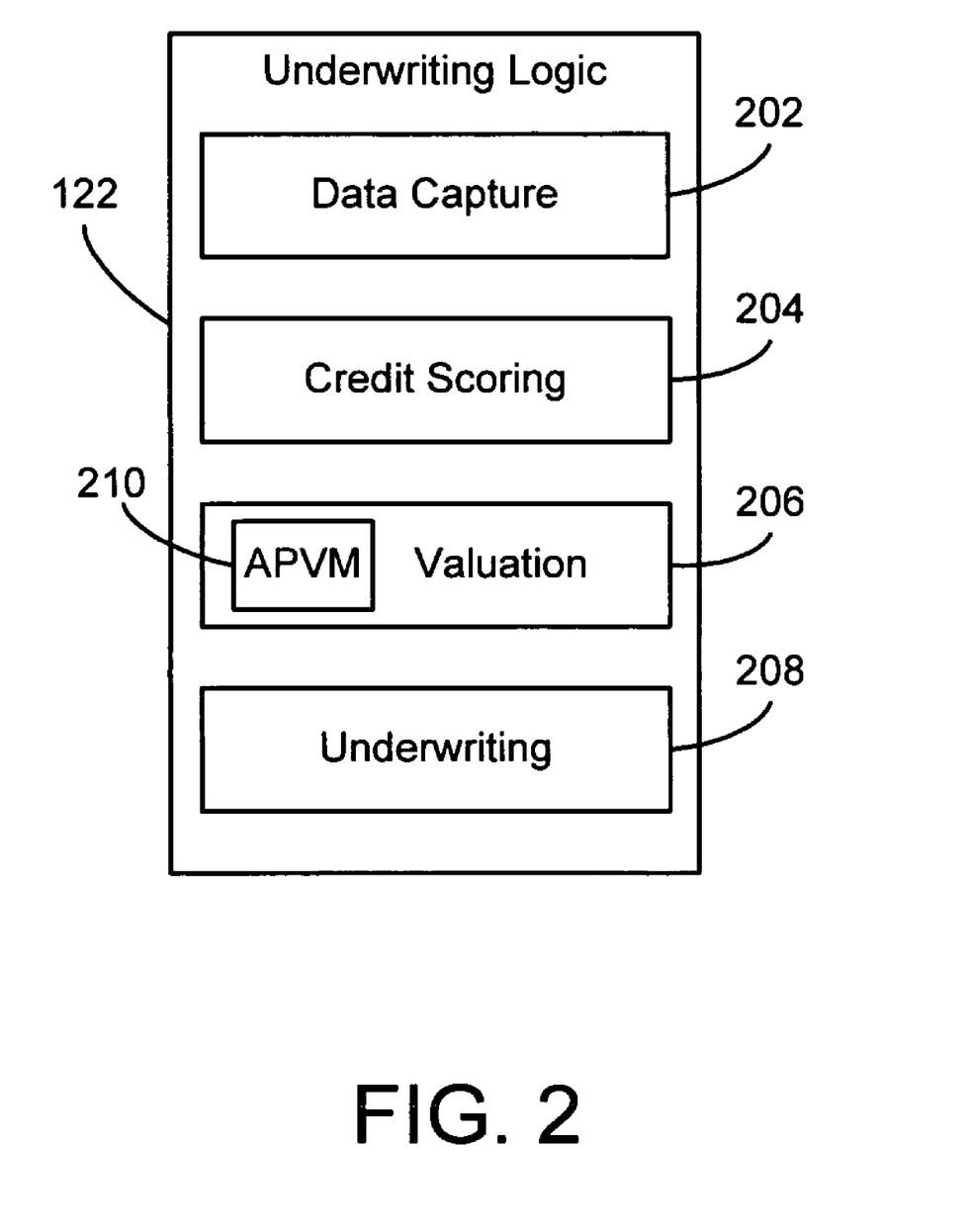
FIG. 2 is a block diagram illustrating an exemplary underwriting engine in greater detail.

FIG. 2 illustrates an exemplary underwriting engine 122 in greater detail. Underwriting engine 122 includes data capture logic 202, credit scoring logic 204, valuation logic 206, and underwriting logic 208. Data capture logic 202 is used to receive loan data or information to be used in loan underwriting and appraisal (e.g., information from a loan application and a credit report), such as loan data from loan originator system 110. Typically, the loan data or information that is received for loan underwriting is a subset of the information that would be provided on a loan application. For example, the loan data or information may include data such as borrower information, loan product information, loan term, loan-to-value ratio, an appraisal value (e.g., submitted by a borrower or loan applicant), income, borrower contribution, loan purpose, loan type, property type, occupancy status, broker information, etc. According to an exemplary embodiment, loan data also includes data related to a foreclosure sale for a property associated with the loan application, and/or data related to a purchase money transaction for a property associated with the loan application.

Credit scoring logic 204 generates a credit score for a borrower or loan applicant based on the borrower or loan applicant's credit history. Valuation logic 206 analyzes an appraisal value associated with a loan, such as an appraisal value submitted by a borrower or loan applicant for a property associated with a mortgage loan received by data capture logic 202, and estimates the accuracy of the submitted appraisal value based on loan data received by data capture logic 202, such as data related to a foreclosure sale for a property associated with the loan application, data indicating that the loan application is associated with a purchase money transaction, or other data from data capture logic 202, and also on an alternative appraisal value.

The alternative appraisal value is performed independent of the submitted appraisal value received from data capture logic 202 and may be determined by, for example, an automated property valuation model (APVM) 210. Automated property valuation model 210 is configured to use information identifying the property, such as an address or other information from data capture logic 202 to determine the alternative appraisal value. According to an exemplary embodiment, automated property valuation model 210 is also configured to determine a statistical confidence interval for the alternative appraisal value. According to another exemplary embodiment, valuation logic 206 also uses sale price data from data capture logic 202 to determine the alternative appraisal value. Sales price data may include data that is included in data related to a foreclosure sale for a property associated with the loan application, data indicating that the loan application is associated with a purchase money transaction, etc.

Underwriting logic 208 is configured to use data or information from data capture logic 202, credit scoring logic 204, and valuation logic 206 to determine if the loan meets credit risk and eligibility requirements of a purchaser or of a lender for the purposes of its portfolio, and to issue a recommendation based on the assessment of the overall risk profile of the loan. For example, underwriting logic 208 may combine the credit score from credit scoring logic and the estimated accuracy from valuation logic 206 with other information (e.g., debt-to-income ratios, income verification, borrower contribution, cash reserves of the borrower, the existence and amount of subordinate financing, and other factors) to determine whether to recommend approval for loan eligibility. Underwriting logic 208 may also be used to generate reports that provide information regarding the underwriting recommendation for a particular loan, information used in determining the recommendation (e.g., property, loan, and borrower information), and information summarizing key statistics from the credit report (e.g., borrower's open accounts, derogatory accounts, and undisclosed accounts).

According to an exemplary embodiment, underwriting logic 208 uses the estimated accuracy from valuation logic 206 to provide a message indicating whether the submitted appraisal value received from data capture logic 202 is potentially excessive. The message may indicate, for example, that the submitted appraisal value appears to be excessive based on an analysis of the available data, such as sales price data included in data related to a foreclosure sale for a property associated with the loan application, data indicating that the loan application is associated with a purchase money transaction, etc. The message may also indicate that risk characteristics for the loan determined from data received from data capture logic 202 (e.g., loan-to value ratios, credit scores, loan or refinance purpose, absence of subordinate financing, etc.) are consistent with loans that are historically associated with excessive property valuations. Alternatively, the message may provide a numerical value or score indicating, for example, the degree to which the submitted appraisal value is potentially excessive.

Figure 3:
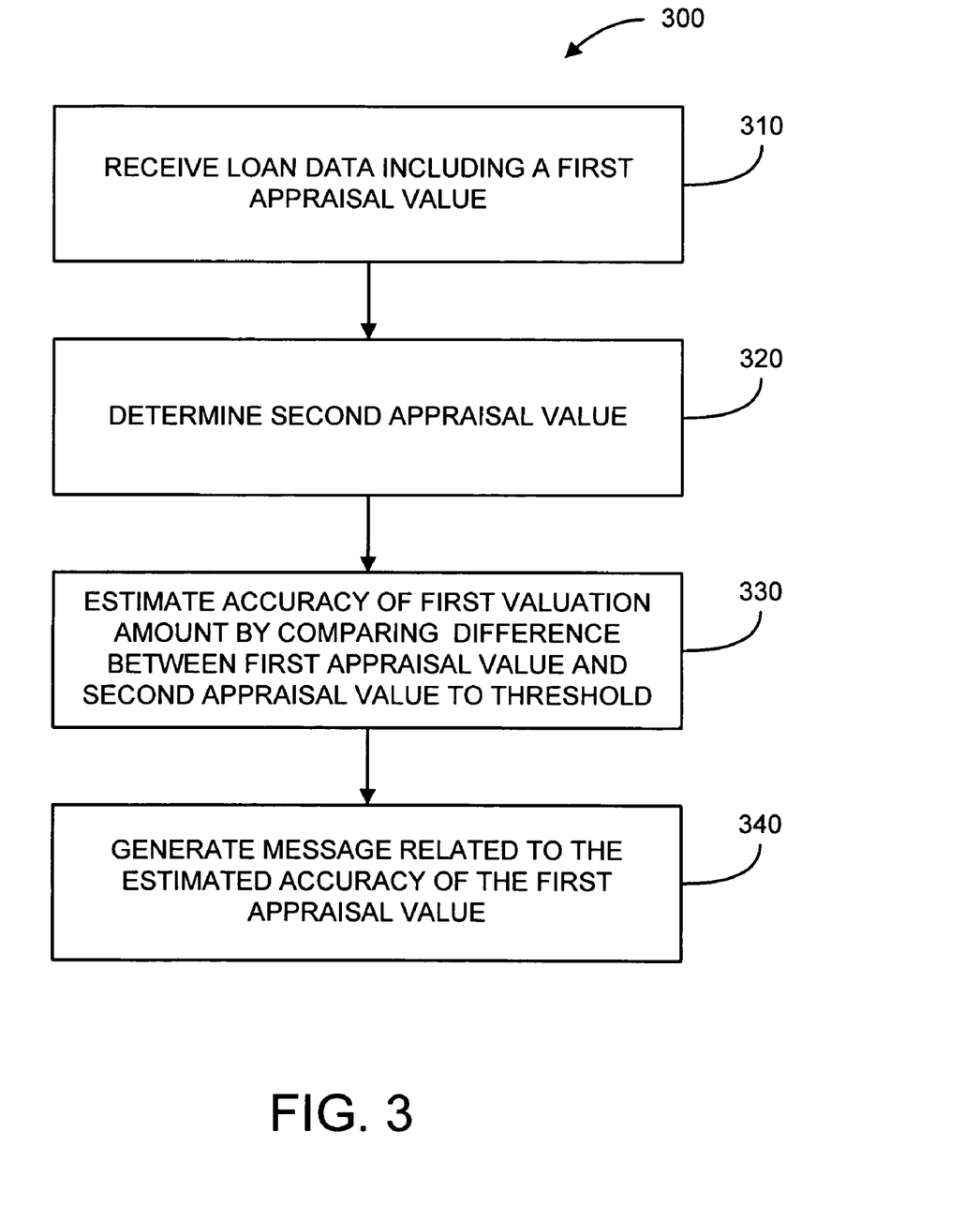
FIG. 3 is a flow diagram illustrating a method of evaluating an appraisal value associated with a loan according to an exemplary embodiment.

FIG. 3 illustrates a method 300 of evaluating an appraisal value associated with a loan according to an exemplary embodiment. Method 300 may be implemented, for example, using system 100 shown in FIG. 1. Method 300 begins with a step 310. In step 310, loan data is received for the loan. Loan data includes, among other data or information commonly associated with loan applications of various types as described above, an appraisal value associated with the loan, such as such as an appraisal value submitted by a borrower or loan applicant and related to a property associated with a mortgage loan. According to an exemplary embodiment, loan data also includes foreclosure sale data and/or purchase money transaction data associated with the loan. Foreclosure sale data includes, for example, an indication of a foreclosure sale in the sale history of a property associated with the loan, the date of the foreclosure sale, the foreclosure sale price, etc. Purchase money transaction data includes, for example, an indication of whether the current lending transaction is a purchase money transaction or a refinance transaction, an indication of a purchase money transaction in the sale history of a property associated with the loan, the date of the purchase money transaction, the amount of the purchase money transaction, etc.

In a step 320, an alternative appraisal value is determined. The alternative appraisal value is determined independently from the appraisal value received in step 310. For example, according to an exemplary embodiment, the alternative appraisal value is determined using an automated property valuation model as described above, and may include determining a statistical confidence interval or confidence score for the alternative appraisal value as an indication of the reliability of the alternative appraisal value. According to another exemplary embodiment, loan data received in step 310 is used to determine the alternative appraisal value, such as a foreclosure sale price or the amount of a purchase money transaction.

In a step 330, the estimated accuracy of the first appraisal value is determined. The accuracy is estimated by first calculating the difference between the appraisal value received in step 310 and the alternative appraisal value determined in step 320. The difference between these amounts is then compared to a predetermined threshold, such as a threshold representative of the percentage of difference between the appraisal value received in step 310 and the alternative appraisal value determined in step 320. The estimated accuracy depends on whether the difference between these amounts exceeds the predetermined threshold. For example, according to an exemplary embodiment, if the predetermined threshold is exceeded, the accuracy is estimated to be sufficiently low such that the appraisal value received in step 310 is considered potentially excessive. According to various alternative embodiments, several different predetermined thresholds associated with varying levels of estimated accuracies are used to provide increasing levels of granularity in the estimated accuracy (e.g., estimated accuracy levels of low, medium, and high).

The predetermined threshold for a particular estimated accuracy is selected based on a number of factors such as, for example, a statistical analysis of various loans with characteristics commonly indicative of significantly excessive appraisal values (e.g., loan-to value ratios, credit scores, loan or refinance purpose, absence of subordinate financing, etc.) and a statistical confidence interval or confidence score determined for the alternative appraisal value in step 320. For example, according to an exemplary embodiment, different thresholds are used for a particular estimated accuracy depending upon the confidence interval or confidence score determined for the alternative appraisal value in step 320, such that for more reliable alternative appraisal values (e.g., higher confidence scores), a lower threshold (e.g., percentage of difference) is used. For less reliable alternative appraisal values (e.g., lower confidence scores), a higher threshold (e.g., percentage of difference) is used. According to alternative embodiments, differing thresholds are optimally associated with differing confidence intervals or scores depending upon, for example, a statistical analysis of various loans with characteristics commonly associated with significantly excessive appraisal values.

According to another exemplary embodiment, the predetermined threshold is based on either foreclosure sale data or purchase money transaction data received in step 310. For example, a lower threshold may be used for loans having associated foreclosure sale data indicating a more recent foreclosure sale, and a higher threshold may be used for loans having associated foreclosure sale data indicating a less recent foreclosure sale. Differing thresholds may be associated with differing foreclosure sale data or purchase money transaction data depending upon, for example, a statistical analysis of various loans with characteristics commonly associated with significantly excessive appraisal values as indicated by foreclosure sale data or purchase money transaction data. According to an exemplary embodiment, a threshold of approximately a thirty percent difference between the appraisal value received in step 310 and the alternative appraisal value determined in step 320 is used for loans having associated foreclosure sale data indicating a foreclosure sale within less than two years of the appraisal value received in step 310, and a threshold of approximately fifty percent is used for where foreclosure sale data for the loan indicates a foreclosure sale between two years and five years of the appraisal value received in step 310. According to yet another exemplary embodiment, a threshold of approximately a fifty percent difference between the appraisal value received in step 310 and the alternative appraisal value determined in step 320 is used for loans having associated purchase money transaction data indicating a purchase money transaction within two years of the appraisal value received in step 310.

In a step 340, a message related to the estimated accuracy in step 330 for the appraisal value received in step 310 is generated. According to an exemplary embodiment, the message related to the estimated accuracy in step 330 is generated when the difference between the appraisal value received in step 310 and the alternative appraisal value determined in step 320 exceeds the predetermined threshold. The message may indicate, for example, that the appraisal value received in step 310 appears to be excessive based on an analysis of the available loan data, such as sales price data included in data related to a foreclosure sale for a property associated with the loan application, data indicating that the loan application is associated with a purchase money transaction, etc. The message may also indicate that risk characteristics for the loan determined from data received from data capture logic 202 (e.g., loan-to value ratios, credit scores, loan or refinance purpose, absence of subordinate financing, etc.) are consistent with loans that are historically associated with excessive property valuations. Alternatively, where multiple levels of estimated accuracy are used, the message may provide a numerical value or score indicating, for example, the degree to which the submitted appraisal value is potentially excessive.

Thus the method of and system for evaluating an appraisal value is configured facilitate the identification of lending transactions with potential excessive valuation issues for a property associated with the loan by using loan information, such as foreclosure sale information or purchase money transaction information, to automatically identify these types of lending transactions. By identifying lending transactions for which a potential excessive valuation issue exists based on this information, lenders may be better able to determine which lending transactions do not pose a significant credit risk, which in turn potentially reduces the number of loans that default or become delinquent, and the costs associated with these loans. Identifying lending transactions for which a potential excessive valuation issue exists may also allow lenders to more efficiently allocate quality control research resources in making lending decisions, and thus reduce lending transaction costs.

The foregoing description of embodiments has been presented for purposes of illustration and description. It is not intended to be exhaustive or to be limited to the precise forms disclosed, and modifications and variations are possible in light of the above teachings or may be acquired from practice of the invention. For example, while the method of and system for evaluating an appraisal value associated with a loan is mainly described in the context of mortgage loans and loan underwriting systems, the method and system are equally applicable to other types of financial products and systems. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A method of evaluating a first appraisal value associated with a mortgage loan, the method comprising the steps of:
    receiving loan data for the mortgage loan in a computerized underwriting system, wherein loan data includes the first appraisal value and at least one of foreclosure sale data and purchase money transaction data, the first appraisal value being received from a loan originator associated with the mortgage loan, the first appraisal value being related to a property associated with the mortgage loan;
    determining a second appraisal value independent of the first appraisal value, the second appraisal value being related to the property associated with the mortgage loan, the second appraisal value being determined using an automated valuation model;
    estimating an accuracy of the first appraisal value based on the second appraisal value and the at least one of foreclosure sale data and purchase money transaction data;
    generating an underwriting recommendation for the mortgage loan at the computerized underwriting system;
    providing the underwriting recommendation to the loan originator; and
    providing a message indicating that a credit risk characteristic for the mortgage loan is consistent with a potential excessive valuation issue for the mortgage loan, the message being provided to the loan originator; wherein the credit risk characteristic comprises one of a loan to value ratio, a credit score, a loan purpose, and an absence of subordinate financing;
    wherein estimating the accuracy of the first appraisal value includes comparing the difference between the first appraisal value and the second appraisal value to a predetermined threshold, the predetermined threshold being determined based on a statistical confidence level determined for the second appraisal value.

2. The method of claim 1, wherein the predetermined threshold is based on the at least one of foreclosure sale data and purchase money transaction data.

3. The method of claim 1, further comprising generating a message related to the accuracy of the first appraisal value.

4. The method of claim 3, wherein the message is generated when the difference between the first appraisal value and the second appraisal value is greater than the predetermined threshold.

5. The method of claim 1, further comprising the steps of: selecting the predetermined threshold based on both:
    (i) an age of foreclosure sale data received as part of the at least one of foreclosure sale data and purchase money transaction data, the predetermined threshold being lower for a more recent foreclosure sale than a less recent foreclosure sale; and
    (ii) a statistical analysis of various loans with characteristics commonly indicative of significantly excessive appraisal values, the characteristics including at least two of the group of: loan-to value ratios, credit score of the borrower, purpose of loan and absence of subordinate financing; and
    wherein estimating the accuracy of the first appraisal value includes comparing the difference to the predetermined threshold to provide an indication whether the first appraisal value appears to be accurate.

6. The method of claim 5, wherein the predetermined threshold is a 30% difference between the first appraisal value and the second appraisal value if the foreclosure sale data indicates the foreclosure sale within less than two years of the first appraisal value.

7. The method of claim 5, wherein the predetermined threshold is a 50% difference between the first appraisal value and the second appraisal value if the foreclosure sale data indicates the foreclosure sale between two years and five years of the first appraisal value.

8. A method of evaluating a first appraisal value associated with a mortgage loan, the method comprising the steps of:
    receiving loan data for the mortgage loan in a computerized underwriting system, wherein loan data includes the first appraisal value and at least one of foreclosure sale data and purchase money transaction data, the first appraisal value being received from a loan originator associated with the mortgage loan, the first appraisal value being related to a property associated with the mortgage loan;
    determining a second appraisal value independent of the first appraisal value, the second appraisal value being related to the property associated with the mortgage loan, the second appraisal value being determined using an automated valuation model; and
    estimating the accuracy of the first appraisal value based on the second appraisal value and the at least one of foreclosure sale data and purchase money transaction data, including comparing the difference of the first appraisal value and the second appraisal value with a predetermined threshold, the predetermined threshold value being determined based on a statistical confidence interval determined for the second appraisal value;

generating an underwriting recommendation for the mortgage loan at the computerized underwriting system;

providing the underwriting recommendation to the loan originator;

providing a message indicating that a potential excessive valuation issue exists for the mortgage loan, the message being provided to the loan originator, and wherein the message indicates that the first appraisal value appears to be excessive based on sales price data related to a foreclosure sale;

wherein for a relatively higher statistical confidence level for the second appraisal value, the predetermined threshold is relatively lower, and for a relatively lower confidence level for the second appraisal value, the predetermined threshold is relatively higher.

9. The method of claim 1, wherein the message indicates that the first appraisal value appears to be excessive based on a loan-to value ratio of the mortgage loan.

10. A method of evaluating a first appraisal value associated with a mortgage loan, the method comprising the steps of:

receiving loan data for the mortgage loan in a computerized underwriting system, wherein loan data includes the first appraisal value and at least one of foreclosure sale data and purchase money transaction data, the first appraisal value being received from a loan originator associated with the mortgage loan, the first appraisal value being related to a property associated with the mortgage loan;

determining a second appraisal value independent of the first appraisal value, the second appraisal value being related to the property associated with the mortgage loan, the second appraisal value being determined using an automated valuation model; and estimating the accuracy of the first appraisal value based on the second appraisal value and the at least one of foreclosure sale data and purchase money transaction data, including comparing the difference of the first appraisal value and the second appraisal value with a predetermined threshold, the predetermined threshold value being determined based on a statistical confidence interval determined for the second appraisal value;

generating an underwriting recommendation for the mortgage loan at the computerized underwriting system;

providing the underwriting recommendation to the loan originator;

determining that a potential excessive valuation issue for the mortgage loan exists based on the accuracy of the first appraisal and a credit score of the borrower;

providing a message indicating that the potential excessive valuation issue exists for the mortgage loan, the message being provided to the loan originator, and wherein the message indicates that the first appraisal value appears to be excessive based on the credit score of the borrower.

11. The method of claim 1, wherein the message indicates that the first appraisal value appears to be excessive based on a purpose of the mortgage loan.

12. The method of claim 1, wherein the message indicates that the first appraisal value appears to be excessive based on the absence of subordinate financing.

13. The method of claim 1, wherein the message indicates a numerical value indicating the degree to which the first appraisal value appears to be excessive.

14. The method of claim 1, wherein the at least one of foreclosure sale data and purchase money transaction data is used to determine the second appraisal value.

15. The method of claim 1, wherein determining the second appraisal value includes determining a confidence interval for the second appraisal value.

* * * * *